US008850045B2

(12) United States Patent
Berg et al.

(10) Patent No.: US 8,850,045 B2
(45) Date of Patent: Sep. 30, 2014

(54) SYSTEM AND METHOD FOR LINKING AND SHARING RESOURCES AMONGST DEVICES

(75) Inventors: Samantha Berg, San Francisco, CA (US); Kim Lenox, Oakland, CA (US); Robert Brown, Pleasant Hill, CA (US); Vitaly Kruglikov, Palo Alto, CA (US); Manjirnath Chatterjee, San Francisco, CA (US); Moses George, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 13/171,878

(22) Filed: Jun. 29, 2011

(65) Prior Publication Data

US 2012/0042087 A1 Feb. 16, 2012

Related U.S. Application Data

(63) Continuation-in-part of application No. 12/916,388, filed on Oct. 29, 2010, and a continuation-in-part of application No. 12/620,478, filed on Nov. 17, 2009, now Pat. No. 8,527,688, said application No. 12/916,388 is a continuation-in-part of application No. 12/478,766, filed on Jun. 4, 2009, now Pat. No. 8,712,324, which is a continuation-in-part of application No. 12/239,656, filed on Sep. 26, 2008, now Pat. No. 8,385,822.

(60) Provisional application No. 61/440,858, filed on Feb. 8, 2011, provisional application No. 61/142,617, filed on Jan. 5, 2009, provisional application No. 61/142,560, filed on Jan. 5, 2009, provisional application No. 61/142,194, filed on Dec. 31, 2008, provisional application No. 61/142,195, filed on Jan. 1, 2009, provisional application No. 61/142,602, filed on Jan. 5, 2009.

(51) Int. Cl.
G06F 15/16 (2006.01)
H04L 29/06 (2006.01)
H04M 1/725 (2006.01)

(52) U.S. Cl.
CPC .............. *H04L 63/08* (2013.01); *H04L 63/18* (2013.01); *H04M 1/7253* (2013.01); *H04M 1/72544* (2013.01); *H04M 2250/02* (2013.01)
USPC ........... 709/229; 709/225; 709/230; 709/231; 709/232

(58) Field of Classification Search
USPC ......................................... 709/225, 229–232
See application file for complete search history.

(56) References Cited

U.S. PATENT DOCUMENTS 5,136,414 A  8/1992 Jenkins
5,284,151 A  2/1994 Onoda (Continued)

FOREIGN PATENT DOCUMENTS

CN  1204929 A  1/1999
CN  1592197 A  3/2005

(Continued)

OTHER PUBLICATIONS

Adam Pash et al. "How to Break Down the Barrier Between Your iPhone and Computer", Web Document from lifehacker Website, Oct. 6, 2010, p. 8, http://lifehacker.com/5656574/how-to-break-down-the-barrier-between-your-iphone-and-computer/.*

(Continued)

*Primary Examiner* — Wing F Chan
*Assistant Examiner* — Padma Mundur
(74) *Attorney, Agent, or Firm* — Mahamedi Paradice LLP

(57) ABSTRACT

A device is enabled to establish a secure and persistent pairing with one another across a communication medium, using credential information that is exchanged out-of-band.

23 Claims, 9 Drawing Sheets

(56) References Cited

U.S. PATENT DOCUMENTS

| | | |
|---|---|---|
| 5,375,226 A | 12/1994 | Sano et al. |
| 5,455,466 A | 10/1995 | Parks et al. |
| D366,470 S | 1/1996 | Youens et al. |
| 5,596,567 A | 1/1997 | deMuro et al. |
| 5,600,225 A | 2/1997 | Goto |
| 5,666,530 A | 9/1997 | Clark et al. |
| 5,708,819 A | 1/1998 | Dunnihoo |
| 5,733,313 A | 3/1998 | Barreras, Sr. et al. |
| 5,760,580 A | 6/1998 | Tyren |
| 5,831,348 A | 11/1998 | Nishizawa |
| 5,930,304 A | 7/1999 | Hollenbeck et al. |
| 5,958,051 A | 9/1999 | Renaud et al. |
| 6,006,274 A | 12/1999 | Hawkins et al. |
| 6,091,965 A | 7/2000 | Voroba et al. |
| 6,138,245 A | 10/2000 | Son et al. |
| 6,184,651 B1 | 2/2001 | Fernandez et al. |
| 6,266,539 B1 | 7/2001 | Pardo |
| D448,385 S | 9/2001 | Oross et al. |
| 6,330,436 B1 | 12/2001 | Zidel |
| 6,389,423 B1 | 5/2002 | Sakakura |
| 6,405,049 B2 | 6/2002 | Herrod et al. |
| 6,436,299 B1 | 8/2002 | Baarman et al. |
| 6,445,936 B1 | 9/2002 | Cannon et al. |
| 6,452,197 B1 | 9/2002 | Ito |
| 6,463,545 B1 | 10/2002 | Fisher et al. |
| 6,501,364 B1 | 12/2002 | Hui et al. |
| 6,510,424 B1 | 1/2003 | Ford et al. |
| 6,532,152 B1 | 3/2003 | White et al. |
| 6,667,881 B2 | 12/2003 | Oross et al. |
| 6,671,700 B1 | 12/2003 | Creemer et al. |
| 6,673,250 B2 | 1/2004 | Kuennen et al. |
| 6,731,071 B2 | 5/2004 | Baarman |
| 6,762,583 B2 | 7/2004 | Ho et al. |
| 6,795,110 B1 | 9/2004 | Kossin |
| 6,803,744 B1 | 10/2004 | Sabo |
| 6,806,649 B2 | 10/2004 | Mollema et al. |
| 6,810,405 B1 | 10/2004 | LaRue et al. |
| 6,812,645 B2 | 11/2004 | Baarman |
| 6,825,620 B2 | 11/2004 | Kuennen et al. |
| 6,831,417 B2 | 12/2004 | Baarman |
| 6,850,986 B1 | 2/2005 | Peacock |
| 6,888,438 B2 | 5/2005 | Hui et al. |
| 6,892,052 B2 | 5/2005 | Kotola et al. |
| 6,917,163 B2 | 7/2005 | Baarman |
| 6,975,198 B2 | 12/2005 | Baarman et al. |
| 6,986,051 B2 | 1/2006 | Le Pennec et al. |
| 7,065,658 B1 | 6/2006 | Baraban et al. |
| 7,077,045 B2 | 7/2006 | Dietrich et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,132,918 B2 | 11/2006 | Baarman et al. |
| 7,149,473 B1 | 12/2006 | Lindlar et al. |
| 7,164,255 B2 | 1/2007 | Hui |
| 7,202,783 B2 | 4/2007 | Want et al. |
| 7,236,742 B2 | 6/2007 | Hall et al. |
| 7,248,017 B2 | 7/2007 | Cheng et al. |
| 7,262,700 B2 | 8/2007 | Hsu |
| 7,271,569 B2 | 9/2007 | Oglesbee |
| 7,286,880 B2 | 10/2007 | Olson et al. |
| 7,313,364 B2 | 12/2007 | Morimoto |
| 7,314,364 B2 | 1/2008 | Mahoney et al. |
| 7,331,793 B2 | 2/2008 | Hernandez et al. |
| 7,352,567 B2 | 4/2008 | Hotelling et al. |
| 7,375,492 B2 | 5/2008 | Calhoon et al. |
| 7,382,636 B2 | 6/2008 | Baarman et al. |
| 7,385,357 B2 | 6/2008 | Kuennen et al. |
| 7,392,059 B2 | 6/2008 | White et al. |
| 7,414,380 B2 | 8/2008 | Tang et al. |
| 7,446,672 B2 | 11/2008 | Johnson et al. |
| 7,454,170 B2 | 11/2008 | Goossens et al. |
| 7,462,951 B1 | 12/2008 | Baarman |
| 7,471,200 B2 | 12/2008 | Otranen |
| 7,471,986 B2 | 12/2008 | Hatlestad |
| 7,495,414 B2 | 2/2009 | Hui |
| 7,509,432 B1 | 3/2009 | Peacock |
| 7,521,890 B2 | 4/2009 | Lee et al. |
| 7,528,323 B2 | 5/2009 | Wu et al. |
| 7,562,813 B2 | 7/2009 | Humphrey et al. |
| 7,565,108 B2 | 7/2009 | Kotola et al. |
| 7,576,514 B2 | 8/2009 | Hui |
| 7,576,657 B2 | 8/2009 | Duron et al. |
| 7,589,285 B2 | 9/2009 | Matsumoto et al. |
| 7,643,798 B2 | 1/2010 | Ljung |
| 7,743,151 B2 | 6/2010 | Vallapureddy et al. |
| 7,751,810 B1 | 7/2010 | Bernoske et al. |
| 7,791,311 B2 | 9/2010 | Sagoo |
| 7,800,044 B1 | 9/2010 | Kahn et al. |
| 7,808,664 B2 | 10/2010 | Wang et al. |
| 7,812,257 B2 | 10/2010 | Gunderman et al. |
| 7,855,529 B2 | 12/2010 | Liu |
| 7,887,341 B2 | 2/2011 | Liao |
| 7,906,936 B2 | 3/2011 | Azancot et al. |
| D641,367 S | 7/2011 | Morabito |
| 8,026,693 B2 | 9/2011 | Burley |
| 8,026,694 B2 | 9/2011 | Kamijo et al. |
| 8,060,214 B2 | 11/2011 | Larson et al. |
| 8,098,043 B2 | 1/2012 | Lin |
| 8,143,848 B2 | 3/2012 | Navid |
| 8,310,200 B2 | 11/2012 | Matouka et al. |
| D674,391 S | 1/2013 | Chatterjee et al. |
| 8,373,387 B2 | 2/2013 | Bourilkov et al. |
| 8,378,625 B2 | 2/2013 | Gourley |
| 8,380,998 B2 | 2/2013 | Azancot et al. |
| 8,415,920 B2 | 4/2013 | Liao |
| 8,437,695 B2 | 5/2013 | Chatterjee et al. |
| D687,038 S | 7/2013 | Chatterjee et al. |
| 2001/0007815 A1 | 7/2001 | Philipsson |
| 2002/0065045 A1 | 5/2002 | Kim |
| 2002/0084698 A1 | 7/2002 | Kelly et al. |
| 2002/0103008 A1 | 8/2002 | Rahn et al. |
| 2003/0048254 A1 | 3/2003 | Huang |
| 2003/0092389 A1 | 5/2003 | Morimoto |
| 2003/0214255 A1 | 11/2003 | Barrman et al. |
| 2003/0233455 A1 | 12/2003 | Leber et al. |
| 2004/0088012 A1 | 5/2004 | Kroll et al. |
| 2004/0130915 A1 | 7/2004 | Baarman |
| 2004/0130916 A1 | 7/2004 | Baarman |
| 2004/0150934 A1 | 8/2004 | Baarman |
| 2004/0192206 A1* | 9/2004 | Hirvonen ............... 455/41.2 |
| 2004/0222751 A1 | 11/2004 | Mollema et al. |
| 2004/0232845 A1 | 11/2004 | Baarman et al. |
| 2004/0259499 A1 | 12/2004 | Oba et al. |
| 2005/0007067 A1 | 1/2005 | Baarman et al. |
| 2005/0030160 A1 | 2/2005 | Goren et al. |
| 2005/0093475 A1 | 5/2005 | Kuennen et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2005/0135573 A1* | 6/2005 | Harwood et al. ......... 379/88.03 |
| 2005/0186903 A1 | 8/2005 | Forbes et al. |
| 2006/0041420 A1 | 2/2006 | Martin et al. |
| 2006/0061958 A1 | 3/2006 | Solomon et al. |
| 2006/0094405 A1 | 5/2006 | Dupont |
| 2006/0123055 A1 | 6/2006 | Atkinson et al. |
| 2006/0132045 A1 | 6/2006 | Baarman |
| 2006/0145660 A1 | 7/2006 | Black et al. |
| 2006/0183462 A1 | 8/2006 | Kolehmainen |
| 2006/0229027 A1 | 10/2006 | Wang et al. |
| 2006/0242278 A1* | 10/2006 | Hawkins ................ 709/221 |
| 2006/0258289 A1 | 11/2006 | Dua |
| 2007/0024238 A1 | 2/2007 | Nakade et al. |
| 2007/0035917 A1 | 2/2007 | Hotelling et al. |
| 2007/0064406 A1 | 3/2007 | Beart |
| 2007/0077965 A1 | 4/2007 | Fox |
| 2007/0120752 A1 | 5/2007 | Takasu |
| 2007/0182367 A1 | 8/2007 | Partovi |
| 2007/0188284 A1 | 8/2007 | Dobbs |
| 2007/0246546 A1 | 10/2007 | Yoshida |
| 2007/0255435 A1 | 11/2007 | Cohen et al. |
| 2007/0290654 A1 | 12/2007 | Govari et al. |
| 2008/0133918 A1 | 6/2008 | You et al. |

(56) References Cited

U.S. PATENT DOCUMENTS

| | | | |
|---|---|---|---|
| 2008/0148350 A1* | 6/2008 | Hawkins et al. | 726/2 |
| 2008/0196086 A1 | 8/2008 | Shintani et al. | |
| 2008/0231537 A1 | 9/2008 | Rofougaran et al. | |
| 2008/0269927 A1 | 10/2008 | Szolyga et al. | |
| 2008/0278894 A1 | 11/2008 | Chen et al. | |
| 2009/0001932 A1 | 1/2009 | Kamijo et al. | |
| 2009/0001941 A1 | 1/2009 | Hsu et al. | |
| 2009/0008148 A1 | 1/2009 | Mashino | |
| 2009/0034591 A1* | 2/2009 | Julian et al. | 375/220 |
| 2009/0069869 A1 | 3/2009 | Stouffer et al. | |
| 2009/0088077 A1 | 4/2009 | Brown et al. | |
| 2009/0096413 A1 | 4/2009 | Partovi et al. | |
| 2009/0106567 A1 | 4/2009 | Baarman | |
| 2009/0146608 A1* | 6/2009 | Lee | 320/108 |
| 2009/0170433 A1 | 7/2009 | Rhodes et al. | |
| 2009/0193500 A1 | 7/2009 | Griffin et al. | |
| 2009/0199219 A1 | 8/2009 | Rofougaran et al. | |
| 2009/0203399 A1 | 8/2009 | Rofougaran | |
| 2009/0212637 A1 | 8/2009 | Baarman et al. | |
| 2009/0212737 A1 | 8/2009 | Johnson et al. | |
| 2009/0233623 A1 | 9/2009 | Johnson | |
| 2009/0322278 A1 | 12/2009 | Franks et al. | |
| 2010/0007449 A1 | 1/2010 | Tait et al. | |
| 2010/0021176 A1 | 1/2010 | Holcombe et al. | |
| 2010/0023204 A1 | 1/2010 | Basir et al. | |
| 2010/0045269 A1 | 2/2010 | LaFranchise et al. | |
| 2010/0070219 A1 | 3/2010 | Azancot et al. | |
| 2010/0076524 A1 | 3/2010 | Forsberg et al. | |
| 2010/0081377 A1 | 4/2010 | Chatterjee et al. | |
| 2010/0081473 A1 | 4/2010 | Chatterjee et al. | |
| 2010/0081483 A1 | 4/2010 | Chatterjee et al. | |
| 2010/0083012 A1 | 4/2010 | Corbridge et al. | |
| 2010/0093279 A1 | 4/2010 | Linsky et al. | |
| 2010/0121965 A1 | 5/2010 | Chatterjee | |
| 2010/0131691 A1 | 5/2010 | Chatterjee et al. | |
| 2010/0146308 A1 | 6/2010 | Gioscia et al. | |
| 2010/0156193 A1 | 6/2010 | Rhodes et al. | |
| 2010/0172090 A1 | 7/2010 | Chatterjee | |
| 2010/0174801 A1 | 7/2010 | Tabaaloute | |
| 2010/0177476 A1 | 7/2010 | Hotelling et al. | |
| 2010/0194336 A1 | 8/2010 | Azancot et al. | |
| 2010/0198453 A1 | 8/2010 | Dorogusker et al. | |
| 2010/0211785 A1 | 8/2010 | Park et al. | |
| 2010/0250986 A1 | 9/2010 | Black et al. | |
| 2010/0257251 A1* | 10/2010 | Mooring et al. | 709/216 |
| 2010/0283599 A1 | 11/2010 | Ma et al. | |
| 2011/0018356 A1 | 1/2011 | Chatterjee | |
| 2011/0028091 A1* | 2/2011 | Higgins et al. | 455/41.2 |
| 2011/0076941 A1 | 3/2011 | Taveau et al. | |
| 2011/0084660 A1 | 4/2011 | Mcsweyn | |
| 2011/0227527 A1 | 9/2011 | Zhu et al. | |
| 2012/0005495 A1 | 1/2012 | Matsuoka et al. | |
| 2012/0015605 A1* | 1/2012 | Sole | 455/41.3 |
| 2012/0032632 A1 | 2/2012 | Soar | |
| 2012/0077432 A1 | 3/2012 | Rose et al. | |
| 2012/0139484 A1 | 6/2012 | Gunderman et al. | |
| 2012/0174165 A1 | 7/2012 | Mondragon et al. | |
| 2012/0198353 A1* | 8/2012 | Lee et al. | 715/748 |

FOREIGN PATENT DOCUMENTS

| | | |
|---|---|---|
| CN | 1956288 A | 5/2007 |
| CN | 101095272 A | 12/2007 |
| CN | 101150308 A | 3/2008 |
| CN | 101228678 A | 7/2008 |
| EP | 395469 A2 | 10/1990 |
| FR | 2601161 A1 | 1/1998 |
| GB | 2389720 B | 9/2005 |
| GB | 2399466 B | 11/2005 |
| GB | 2389767 B | 4/2006 |
| JP | 09-259241 A | 10/1997 |
| JP | H10290705 A | 11/1998 |
| JP | 11-354348 A | 12/1999 |
| JP | 3161388 B2 | 2/2001 |
| KR | 20080036702 A | 4/2008 |
| KR | 10-0836634 | 6/2008 |
| KR | 10-0863420 B1 | 10/2008 |
| KR | 10-2010-0136255 A | 12/2010 |
| WO | WO-95-03686 A1 | 2/1995 |
| WO | WO-2005-024865 A2 | 3/1995 |
| WO | WO-02093811 | 11/2002 |
| WO | WO-2004-098079 A1 | 11/2004 |
| WO | WO-2008-033670 A2 | 3/2008 |
| WO | WO-2008-044875 A1 | 4/2008 |
| WO | WO-2008-133806 A1 | 11/2008 |
| WO | WO-2009-057771 A1 | 5/2009 |
| WO | WO-2010-005324 A1 | 1/2010 |
| WO | WO-2010036501 A2 | 4/2010 |
| WO | WO-2010-062198 A1 | 6/2010 |
| WO | WO-2010-068062 A2 | 6/2010 |
| WO | WO-2010/077994 A2 | 7/2010 |
| WO | WO-2010077991 A2 | 7/2010 |
| WO | WO-2010078444 A2 | 7/2010 |
| WO | WO-2010-091269 A1 | 8/2010 |
| WO | WO-2011063033 A2 | 5/2011 |
| WO | WO-2012058629 A2 | 5/2012 |

OTHER PUBLICATIONS

AdvancedCardSystems, "ACR122U NFC Contactless Smart Card Reader—URL Transfer," available at URL < http://www.youtube.com/watch?v=USImfpCZaTo >, uploaded Oct. 12, 2010.

Kean, I., "NFC Tags Must Offer the Right Balance of Cost and Performance," Found at URL < http://webcache.googleusercontent.com/search?q=cache:http://www.wirelessdesignmag.com/ShowPR~PUBCODE~055~ACCT~0031760~Issue~0704~RELTUPE~PR~PRODCODE~R0190~PRODLETT~A.html >, Innovision Research and Technology Plc., 2011.

international Search Report and Written Opinion, International Application No. PCT/US2012/024202, Date of Completion: Apr. 26, 2012, Date of Mailing: Apr. 27, 2012, pp. 1-9.

U.S. Appl. No. 11/430,786, filed May 8, 2006, Baraban et al.

U.S. Appl. No. 12/628,401, filed Dec. 1, 2009, Chatterjee.

U.S. Appl. No. 12/840,241, filed Jul. 20, 2010, Chatterjee.

U.S. Appl. No. 12/841,001, filed Jul. 21, 2010, Chatterjee.

U.S. Appl. No. 12/916,388, filed Oct. 29, 2010, Chatterjee et al.

U.S. Appl. No. 12/975,335, filed Dec. 21, 2010, Oh et al.

U.S. Appl. No. 12/987,940, filed Jan. 10, 2011, Chatterjee et al.

U.S. Appl. No. 29/323,686, filed Aug. 28, 2008, Matsuoka et al.

U.S. Appl. No. 29/323,688, filed Aug. 28, 2010, Matsuoka.

Extended European Search Report, European Application No. 11186983.0, Apr. 24, 2012, pp. 1-15.

Hui et al., "A New Generation of Universal Contactless Battery Charging Platform for Portable Consumer Electronic Equipment," IEEE Trans Power Electronics, 20(3):620-627, (2005).

International Search Report and Written Opinion dated Aug. 20, 2010 in International Application No. PCT/US2009/069847.

International Search Report and Written Opinion dated Aug. 31, 2010 in International Application No. PCT/US2010/020054.

International Search Report and Written Opinion dated Apr. 20, 2010 in International Application No. PCT/US2009/055928.

International Search Report and Written Opinion dated Jul. 21, 2010 in International Application No. PCT/US2009/068328.

International Search Report and Written Opinion dated Jul. 28, 2010 in International Application No. PCT/US2009/068332.

International Search Report and Written Opinion, International Application No. PCT/US2011/058449, Date of Mailing: May 16, 2012, pp. 1-11.

Kean, Steven, "Powermat Portable Wireless Charging Mat," pp. 1-12 downloaded from http://www.bigbruin.com/content/powermat_1 on Sep. 29, 2010.

Liang et al., "An implantable bi-directional wireless transmission system for transcutaneous bilogical signal recording," Physiol. Meas. 26:83-97 (2005).

Mel B. W. et al., "Tablet: Personal Computer in the Year 2000", Communications of the Association for Computing Machinery, New York, NY, vol. 31, No. 6, Jun. 1, 1988, 639-646 XP000047633ISSN: 0001-0782.

Opticon Users Manual DWT 7133, Nov. 2000.

(56) References Cited

OTHER PUBLICATIONS

Chawla et al., State of the Art in Inductive Charging for Electronic Appliances and its Future in Transportation. 2012 Florida.
Energizer. Portable Power for mobile devices. 2012.
Ghovanloo et al. A Wide-Band Power-Efficient Inductive Wireless Link for Implantable Microelectronic Devices Using Multiple Carriers. IEEE Transactions on Circuits and Systems vol. 54. No. 10. Oct. 2007.
iPort. LaunchPort-the world's first inductive charging and mounting system for iPad 2. Nov. 15, 2011.
Niza, Basharat, Inductive Charging Technique, IJETT, vol. 4, Issue 4, Apr. 2013.
Noka. Nokia Wireless Charging Plate DT-900 User Guide, Issue 1.3. 2012.
Omar et al. Engineering Design for Car Induction Charger for Mobile Phone. 2012.

* cited by examiner

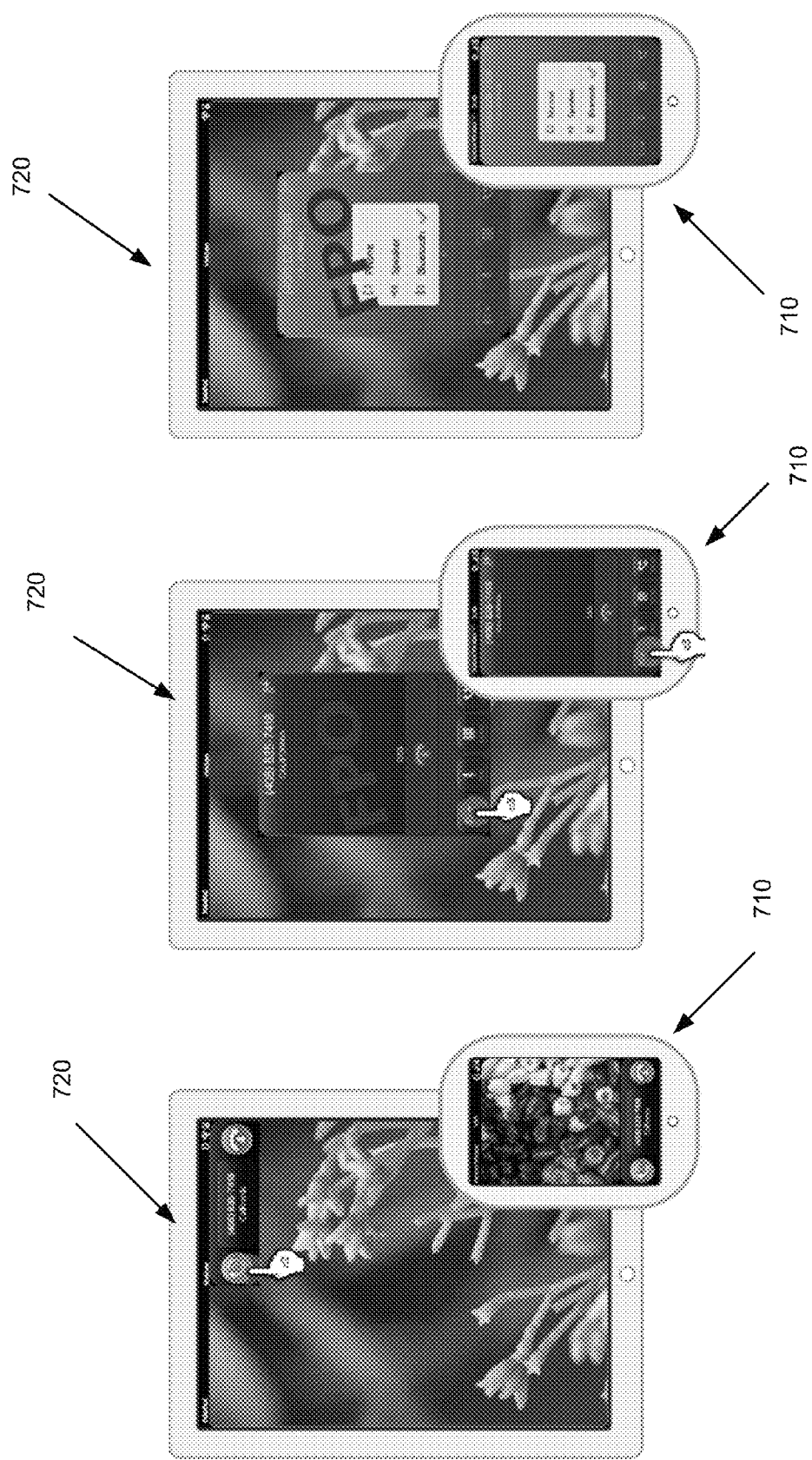

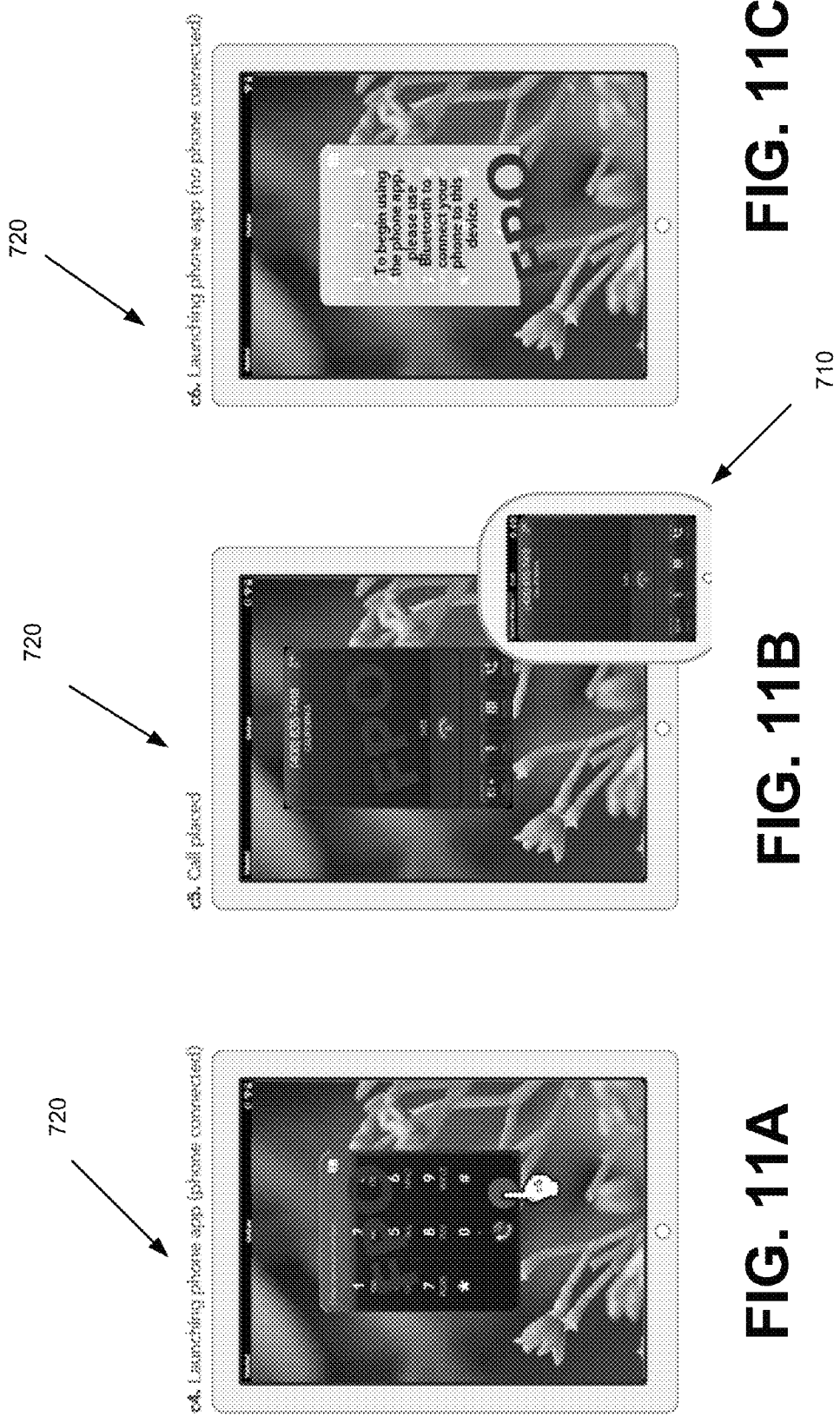

SYSTEM AND METHOD FOR LINKING AND SHARING RESOURCES AMONGST DEVICES

RELATED APPLICATIONS

This application is a continuation-in-part of U.S. patent application Ser. No. 12/916,388, filed Oct. 29, 2010, titled SYSTEM AND METHOD FOR INDUCTIVELY PAIRING DEVICES TO SHARE DATA OR RESOURCES, and also claims the benefit of priority under 35 U.S.C. 119(e) to Provisional Application Ser. No. 61/440,858, filed Feb. 8, 2011, titled SYSTEM AND METHOD FOR LINKING AND SHARING RESOURCES AMONGST DEVICES, each of which is incorporated herein by reference in its entirety.

This application is a continuation-in-part of U.S. patent application Ser. No. 12/620,478, filed Nov. 17, 2009 now U.S. Pat. No. 8,527,688, entitled EXTENDING DEVICE FUNCTIONALITY AMONGST INDUCTIVELY LINKED DEVICES; which benefit of priority to Provisional U.S. Patent Application No. 61/142,617, entitled AUDIO DOCKING STATION WITH MAGNETIC POWER COUPLING AND AUTOPAIRING, filed Jan. 5, 2009; the aforementioned priority applications being hereby incorporated by reference.

This application is also a continuation-in-part of U.S. patent application Ser. No. 12/478,766, filed Jun. 4, 2009 now U.S. Pat. No. 8,712,324, entitled INDUCTIVE SIGNAL TRANSFER SYSTEM FOR COMPUTING DEVICES; which is a continuation-in-part of U.S. patent application Ser. No. 12/239,656, filed Sep. 26, 2008 now U.S. Pat. No. 8,385,833, entitled ORIENTATION AND PRESENCE DETECTION FOR USE IN CONFIGURING OPERATIONS OF COMPUTING DEVICES IN DOCKED ENVIRONMENTS, which claims benefit of priority to the following applications: Provisional U.S. Patent Application No. 61/142,560, filed Jan. 5, 2009, entitled ELECTRICAL APPARATUS FOR REAL TIME WIRELESS POWER DELIVERY; Provisional U.S. Patent Application No. 61/142,194, filed Dec. 31, 2008, entitled PROTOCOL FOR REAL TIME POWER AND ACCESSORY DATA CONNECTION; Provisional U.S. Patent Application No. 61/142,195, filed Jan. 1, 2009, entitled TECHNIQUES FOR MAGNETICALLY COUPLING CHARGING CIRCUITS AND DEVICES; Provisional U.S. Patent Application No. 61/142,602, filed Jan. 5, 2009, entitled MAGNETIC CLASP WITH MULTIPLE ORIENTATIONS AND ORIENTATION DETECTION; the aforementioned priority applications being hereby incorporated by reference.

This application hereby incorporates by reference the following: U.S. patent application Ser. No. 12/841,001, filed Jul. 21, 2010, entitled POWER BRIDGE CIRCUIT FOR BI-DIRECTIONAL INDUCTIVE SIGNALING; and U.S. patent application Ser. No. 12/628,401, filed Dec. 1, 2009, entitled POWER BRIDGE CIRCUIT FOR BI-DIRECTIONAL WIRELESS POWER TRANSMISSION.

TECHNICAL FIELD

The disclosed embodiments relate to a system and method for linking and sharing resources amongst devices.

BACKGROUND

The use of docking stations and other accessory devices in connection with mobile computing devices (e.g. smart phones, media players etc.) is well known. Traditionally, docking stations are used to (i) recharge or supply power to the mobile computing device, (ii) enable the computing device to communicate with other devices connected to the docking station (e.g. synchronization with a personal computer), or (iii) use additional resources provided with the docking station (e.g. speakers for audio output).

In a traditional scheme, docking stations and mobile computing devices connect using insertive male/female connectors. Numerous factors come into consideration when mobile devices are designed with connectors for use with docking stations. For example, such connectors typically take into account the ease by which users may establish the connection (e.g. can the user simply drop the device into the cradle), as well as the mechanical reliability of the connectors. When users repeatedly mate devices with docking stations, both the mating action and the removal of the device from the docking station can strain the connector structure and its elements.

Connectors also restrain the amount by which a device's form factor can be reduced in thickness and/or other dimensions. Connector schemes (particularly those that abide by an industry standard) have constraints that dictate the physical dimensions of the male and female ends of the connectors. As devices get smaller, accommodating the size constraints of the connectors has become more challenging.

BRIEF DESCRIPTION OF THE DRAWINGS

FIG. 10A through FIG. 10C illustrate application data sharing amongst paired devices, in response to occurrences of application events, according to one or more embodiments.

FIG. 11A through FIG. 11C illustrate a variation to application data sharing amongst paired devices, in response to occurrences of application events, according to one or more embodiments.

DETAILED DESCRIPTION

Figure 1:
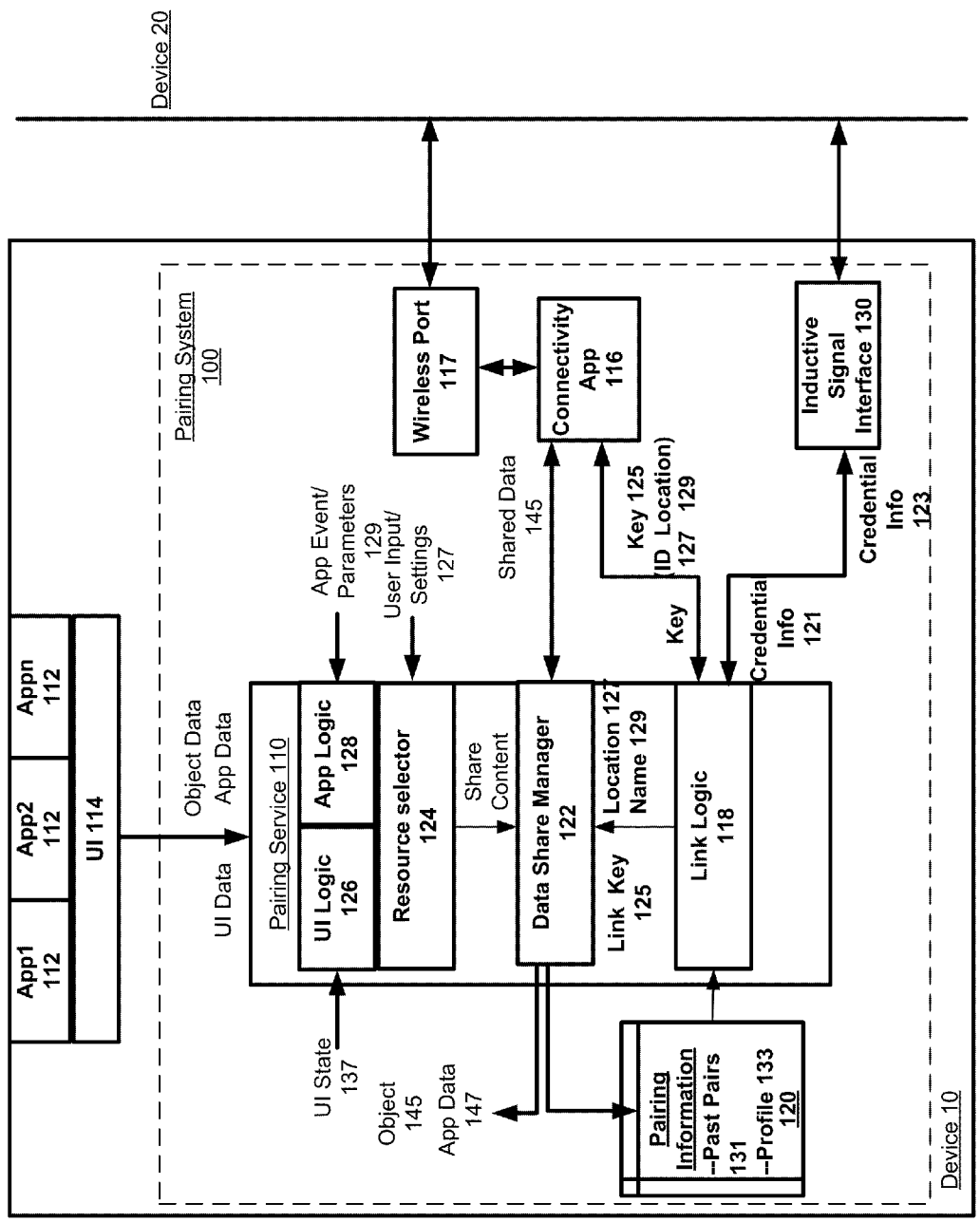
FIG. 1 illustrates a pairing system that may be implemented on a computing device in order to enable linking and sharing of resources with other devices, in accordance with various embodiments described herein.

Embodiments described herein enable a computing device to be paired to another device. In particular, embodiments enable devices to establish a secure and persistent pairing with one another across a wireless, radio-frequency communication medium, using credential information that is exchanged out-of-band (e.g. communicated inductively or through alternative communication mediums).

According to an embodiment, credential information is received for enabling a computing device to communicate with another device. The credential information may be communicated using a first medium. The computing device may generate a link key for communicating with the second computing device over a second communication medium, using the credential information communicated over the first medium. The link key may be stored for use in pairing the first computing device to the second computing device repeatedly, so as to enable multiple communication sessions to be conducted using the same link key.

In variations, both the first and second communication medium may be inductive. Still further, one communication medium may be through cloud computing.

As used herein, the term "inductive" or "inductively" refers to use of electromagnetism to transfer an electrical signal. An inductive signal transfer uses electromagnetic flux variations or electromagnetic resonance to induce signal transfer. Electromagnetic resonance or evanescent coupling can enable inductive coupling even when the devices that are being coupled are physically separated from one another.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances, laptop computers, printers, picture frames, tablets. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs), and magnetic memory. Computers, terminals, network enabled devices (e.g. mobile devices such as cell phones) are all examples of machines and devices that utilize processors, memory, and instructions stored on computer-readable mediums.

FIG. 1 illustrates a pairing system that may be implemented on a computing device in order to enable linking and sharing of resources with other devices, in accordance with various embodiments described herein. The system 100 can be implemented on various types of computing devices, such as for example, a portable computing device that includes wireless networking and/or telephony capabilities. In particular, embodiments described herein may apply to numerous kinds of mobile or small form-factor computing devices. As an example, the computing device may correspond to a device that includes roaming wireless network and/or telephony capabilities, including cellular telephony devices and/or mobile messengers. Other types of computing devices on which system 100 can be implemented on include laptops, notebooks and tablet devices. In some implementations, such devices are capable of providing cellular telephony features in combination with other applications, such as messaging, web browsing, media playback, personal information management (e.g., such as contact records management, calendar applications, tasks lists), image or video/media capture and other functionality. As a class, portable computing devices can have numerous types of input mechanisms and user-interface features, such as keyboards or keypads, multi-directional or navigation buttons, application or action buttons, and contact or touch-sensitive display screens. Some devices may include combinations of keyboard, button panel area, and display screen on one façade. Other devices may include primarily a display façade. Still further, one or more embodiments may be implemented through any type of computing device such as a desktop computer that is configured to include real-time voice data exchange (e.g. through use of Internet Protocol telephony).

Computing device 10 may operate one or more connectivity applications 116 that control use of local wireless communication ports 117. For example, computing device 10 may include a Bluetooth application for controlling a Bluetooth communication port. Similarly the computing device 10 may include a WiFi application for controlling it WiFi communication port (e.g. for connecting to hotspot, other devices using WiFi Direct, access point connections, Ad-Hoc connections).

According to some embodiments, the computing device 10 also includes an inductive signal interface 130. The inductive signal interface 130 may be structured to transmit power and/or data. In some implementations, the inductive signal interface 130 may include one or more coils which transmit power, as well as modulated inductive signals that carry data. For example, the inductive signal interface 130 may be implemented through use of magnetic coils and signaling protocol, implemented on Touchstone devices (manufactured by the Hewlett-Packard Inc.). In some variations, the inductive signal interface 130 is provided as a standardized NFC (Near Field Communication) port.

The computing device 10 may also include a library of applications 112 which can operate as a high-level operating layer on the operating system of the device. In one embodiment, a user interface 114 may be provided as a component of the operating system, on which content and interfaces from other applications are presented.

The pairing system 100 enables the computing device 10 to pair to other devices that have some similar capabilities and components as those described with computing device 10. In the example shown by FIG. 1, computing device 10 pairs to a second computing device 20, which for purpose of simplicity, can be assumed to include components that are equivalent or compatible to, for example, the pairing system 100 and the inductive signal interface 130. For example, the first and second computing devices 10, 20 may correspond to devices that are owned or operated by the user (or by different users), and which share resources for local wireless communications and inductive signal transfer (power and data). Accordingly, components and functionality that are described on computing device 10 for purpose of establishing pairing with the second computing device 20 may be assumed to have equivalents to components and functionality performed on the second computing device 20, for purpose of pairing to device 10. For brevity, computing device 10 is described in detail, as the description provided is applicable to the second computing device 20 (or other computing devices that may pair to the first computing device 10).

On computing device 10, the pairing system 100 identifies non-secure identification information from the second computing device 20. This information can include, for example, (under the Bluetooth protocol) the location 127 and the name of the second device 20. Additionally, pairing system 100 generates a unique and secure link key 125 for the second computing device. Both types of information is then stored and used for subsequent pairing to the second computing device 20. The information may be stored in the pairing information data store 120.

Once generated on the computing device 10, the link key 125 is persistent, in that it can be used by the first computing device 10 to pair to the second computing device 20 over multiple instances. Each time the two devices pair, a communication session is formed in which one or both devices exchange data with the other device. As described with other embodiments, the data that is exchanged may include objects (e.g. URLs), application data, content, or references to such data.

Furthermore, the generation of the link key 125 enables computing device 10 to programmatically, or at least substantially automatically, pair to the second computing device 20 when the second computing device becomes available to the first computing device 10. In particular, the pairing between the two devices may occur over a local wireless communication medium, such as provided through the wireless port 117. When the two devices encounter one another (e.g. when the two devices are brought into range of the local wireless communication port), the link key 125 (along with the identifier 127 and location 129 of the second device 20) are used to automatically (or substantially automatically) pair the two devices together. As a result of the pairing, the one or both devices communicates data, using the communication medium of the local wireless communication port 117. As examples, the pairing between the first and second computing devices 10, 20 may correspond to the user pairing two mobile computing devices (e.g. smart phones), mobile computing device and other portable computer device (e.g. smart phone and tablet), or between any two computing devices (e.g. smart phone, tablet, laptop, personal computer).

With further reference to FIG. 1, the pairing system 100 uses pairing services 110 and pairing information store 120. The pairing service 110 includes link logic 118, data share manager 122, resource selector 124, UI logic 126, and application logic 128. The link logic 118 receives credential information 121 that is transmitted from the second device 20. The credential information 121 includes (i) name 127 of the second device, (ii) location 129 of the second device. If the second device has a link key for the first computing device, the link key may be used to communicate the credential information and/or subsequent data. On the first device 10, the link logic 118 utilizes the credential information 121 to generate the link key 125. The link key 125 is used to conduct subsequent wireless communications with the first device 10 over the local wireless communication medium.

According to at least some embodiments, the credential information 121 of the second computing device 20, used in generating the corresponding link key 125, may be received on the first device 10 over anyone of multiple communication mediums. As described with FIG. 1, some implementations enable the credential 121 information to be received over the local wireless communication port 117.

According to some embodiments, the credential information 121 is received from an out-of-band medium (other than the wireless communication port 117). In particular, the first and second computing device 10, 20 can inductively couple to exchange credential information 121 over the inductive signal interface 130. Thus, the first computing device 10 can also transmit its credential information 123 to the second computing device 20 over the same inductive interface. The exchange of credential information 121, 123 over the inductive signal interface 130 provides the necessary data for establishing a connection using the local wireless communication port 117. The link logic 118 uses the credential information 121, without having to use any information or data communicated by the second computing device 20 across the local wireless communication port 117 (for which the link key is to be generated). Furthermore, the link logic 118 does not communicate the credential information 123 of the first computing device using the medium of the local communication port 117.

Thus, the exchange of credential information 121, 123 over the inductive communication medium is complete in that it enables exchange of all data and information needed to establish a connection using the local wireless communication port 117. Moreover, the credential information 121, 123 is communicated amongst the devices without using the local wireless communication port 117.

Once the link key 125 (as well as other information provided from exchange of credential information 121, 123) is established on the first computing device 10 (for use in communicating with the second computing device 20), the information is stored in the data store 120 for subsequent use (note data may alternatively be transaction bound or transient). In one embodiment, the devices are paired using the link key 125 (in other information established by the credential information) when the two devices are in range of one another on the medium of the local communication port 117. The pairing may be performed automatically and seamlessly, so that occurs with no user input. Alternatively, the pairing may be performed with some programmatic or automatic implementation, so that the user may enter some input (e.g. confirmation input), but does not have to, for example, select the particular device that he would like to pair to.

At individual instances when the two devices are paired, the computing device 10 can enter into a data sharing mode with the second computing device in order to send and/or receive data. The resource selector 124 may identify what data is to be selected for transmission to the second computing device 20. In one embodiment, the resource selector 124 may utilize user input and/or settings 127 in order to identify what data is to be selected and transmitted. The user input and/or settings 127 may identify preferences of the user as to what data is to be communicated to the second computing device 20, as well as the user's preference for the level of automation in transferring such data (e.g. fully automated versus prompting versus manual selection).

The resource selector 124 may also include UI logic 126 and application logic 128 for identifying data that is to be communicated to the second computing device 20. Depending on design implementations, user settings, and other parameters, data identified to be transmitted to the second computing device 20 may be identified from the user interface logic 126 and/or application logic 128. In particular, one or more embodiments provide that data is selected, or preselected, for transmission to the second computing device based on the state of the user interface 114. The input 137 of the state of the user interface 114 may identify, for example, the particular application that is in focus or in use, or alternatively the content item that the user has selected to be in focus/in use or otherwise shared. In this way, the UI logic 126 may identify what object, application data, content, or other information is to be communicated when the first and second computing devices 10, 20 are paired over the local wireless communication port 117.

As an addition or alternative, application logic 128 drives, or otherwise selects what object, application data or content is to be communicated to the second computing device 10. The application logic 128 may be responsive to specific application events and parameters 129, and may identify objects or data that is in use on the application. For example, the application event 129 may correspond to an incoming phone call, which causes the application logic 128 to identify caller information and route data corresponding to the incoming phone call to the paired second computing device 20.

The resource selector 124 can also use priority schemes, rules and logic in identifying what data is to be shared from the computing device 10 when the computing device is paired to the second computing device 20.

The data share manager 122 communicates selected data 135 to the second computing device 20. The selected data 145 may correspond to, for example, an object (e.g. URL, record, image file, media file) that can be handled by a corresponding application on the second computing device 20. As an alternative or addition, the selected data 145 may be application data, generated to replicate operation of an application on the second computing device 20. The pairing services 110 may utilize the connectivity application 116 for the local wireless communication port 117 in order to communicate the selected shared data 145 to the second computing device 20. The connectivity application 116 may utilize the link key 125, as well as location information (or device address) and identification information of the second device 20 in maintaining and exchanging communications with the second computing device 20. The link key 125 may be communicated to the connectivity application 116 by, for example, link logic 118. The link logic 118 may retrieves\ the link key 125 (and other information for establishing and using the link to the second computing device 20) from the pairing information store 120. The pairing information data store 120 maintains a list of known devices 131 (e.g. devices that have previously been paired with computing device 10). Additionally, some embodiments provide that the pairing information data store 120 may maintain a list 133 of devices that are on a common profile (e.g. same user profile). Other information may also be maintained by the pairing information data store 120, such as, for example, device types and/or resources available on known devices (e.g. screen size).

The data share manager 122 communicates the selected data ("shared data 145") to the connectivity application 116, for transmission to the second device 20 using the local wireless communication port 117. Alternatively, the data share manager 122 (or other component of the pairing services 120) may direct one of the applications 112 or other component to communicate selected data to the second computing device 20 using the connectivity application 116 and local wireless communication port 117. In one embodiment, the connectivity application 116 corresponds to Bluetooth application. Under normal Bluetooth operations, the Bluetooth application encrypts the selected data 135 when transmitting to the second computing device 20.

When pairing occurs, the communications between the devices may be bi-directional. Data share manager 122 may process data, received through operation of the connectivity application 116. In one embodiment, the device 10 receives an object. The data share manager 122 identifies an application for the object, and forwards the object to the application for use. The application logic 128 may further trigger the application receiving the object to launch and to utilize the object received from the second device.

In another embodiment, the device 10 receives application data. The application data may be communicated in response to an application event, such as a call connect event, messaging event or notification. The application data may be communicated to a corresponding application in order to enable the application to partially or completely respond to the application event (e.g. receive message, handle notification, receive or complete call connect). In such embodiments, the data share manager 122 may be configured to make objects 145 and application data 147 available for use by the appropriate application.

Methodology

FIG. 2 through FIG. 6 illustrate various methods for operating computing devices to pair computing devices such as described with an embodiment of FIG. 1 to one another, according to one or more embodiments. Accordingly, reference is made to FIG. 1 for purpose of illustrating suitable components and elements for implementing a step or sub step being described.

Figure 2:
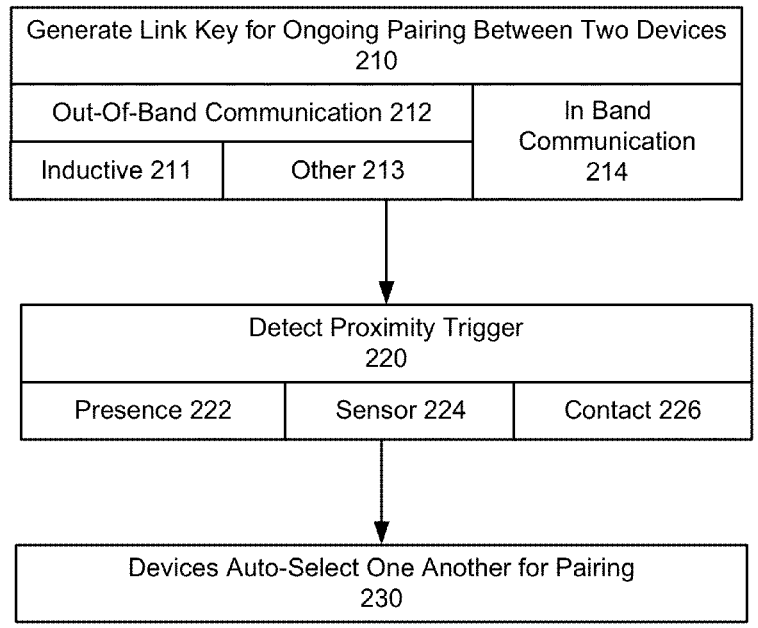
FIG. 2 illustrates a method for pairing two devices, according to embodiments described herein.

In FIG. 2, a method is described for enabling repeated pairing of computing device 10 to second computing device 20, according to one or more embodiments. In an embodiment, the computing device 10 exchanges credential information 121 with the second computing device 20 in order to generate the link key 125 (210). As described with an embodiment of FIG. 1, the pairing services 120 of the computing device 10 generate the link key 125 for the second computing device 20 using credential information 121 that is communicated from the second device 20. The link logic 118 also communicates the credential information 123 of the device 10 to the second computing device in order to enable that device to generate a corresponding link key for the first computing device 10.

According to one or more embodiments, the computing devices 10, 20 exchange respective credential information 121, 123 using an out-of-band medium (212). The out-of-band medium corresponds to a communication medium other than the one that is to be used with the pairing using the link key 125. As described with an embodiment of FIG. 1, the out-of-band communication medium may correspond to an inductive communication channel (211). As an alternative or variation, alternative out-of-band communication mediums may be used. Specific examples include (i) RF transports other than the transport of the local communication medium (e.g. use cellular or WiFi link to receive credential information 121, for use in establishing Bluetooth link); (ii) physical connector, such as provided by a USB type connector or FireWire; (iii) optical coupling (e.g. infrared); (iv) acoustic coupling, or (v) QR similar system.

While out-of-band connectivity may be used to exchange the credential information 121, in-band connectivity may also be used to receive the credential information (214). In particular, in-band connectivity may be used when, for example, the computing device 10 is seeking to establish pairing with another device that does not have the same resources (e.g. no inductive signal interface 130).

In some implementations, the generation of the link key 125 on the computing devices 10, 20 coincides or is concurrent with the two computing devices being paired. For example, in some embodiments, the first and second computing devices exchange credential information 121, 123 when the two devices are inductively coupled. This may correspond to the act of the user bringing the two devices together, in a manner that enables the inductive signal interface 130 (of the computing device 10) and of the second computing device to exchange data. With exchange of the credential information 121, 123, and generation of the link key 125, the two devices may also be auto paired so that they can communicate using, for example, a Bluetooth communication medium or some other local wireless connection.

In contrast to more conventional approaches, embodiments enable the use of out-of-band communication mediums (e.g. inductive coupling) to securely generate a link key for use in pairing the two devices together using a local wireless communication medium. The out-of-band communication can also eliminate the need for requiring the user to select what device he or she wants to be paired with. For example, the user may tap the two inductive signal interfaces of the computing device 10, 20 in order to generate the link key for enabling subsequent wireless communications between the two devices. The activity causes the inductive coupling (e.g. to tap between the two devices) to coincide with the act of the user selecting what device he or she wants to pair with.

The pairing across a local wireless communication medium is session-based, meaning that pairing terminates when, for example, one device becomes unavailable, when a sharing mode or task is complete, or when the two devices are separated by a distance that is outside of the range of the local wireless communication medium. The link key 125 may be stored on the computing device 10 (and conversely, the corresponding link key for device 10 may be stored on the second computing device 20) to enable future pairings between the two devices using the local wireless communication port 117.

According to some embodiments, the pairing between the two computing devices 10, 20 is repeated using the link key 125. In some embodiments, the two computing devices auto-pair using their respective link keys 125 based on proximity triggers 120 (220). The proximity triggers can include presence merely of one or both devices, sufficient to establish connectivity using the local wireless communication medium of the link key 125 (222). In other embodiments, other proximity triggers are used. In particular, one or both devices may employ sensors (e.g. optical, acoustic) to detect the presence of the other computing device (224). Alternatively, RF sensors may be used. For example, the link key 125 may be generated for use in establishing pairing over a medium such as cellular or WiFi. Bluetooth proximity determination may be used to identify when the two devices are in sufficient proximity to one another. Still further, some embodiments may auto pair the two devices when they are brought in close proximity or contact to one another (226). For example, an inductive signal interface such as described with FIG. 1 may be used to determine either proximity or contact. When such proximity/contact is made, one or both devices 10, 20 uses the link key 125 to establish a connection using the local wireless communication medium 117.

Upon proximity triggers being detected, the two devices 10, 20 auto select one another for pairing, using the link key 125 (240). In contrast to many conventional approaches, the two devices may auto pair using the link keys communicated out of band, over multiple communication sessions.

Figure 3:
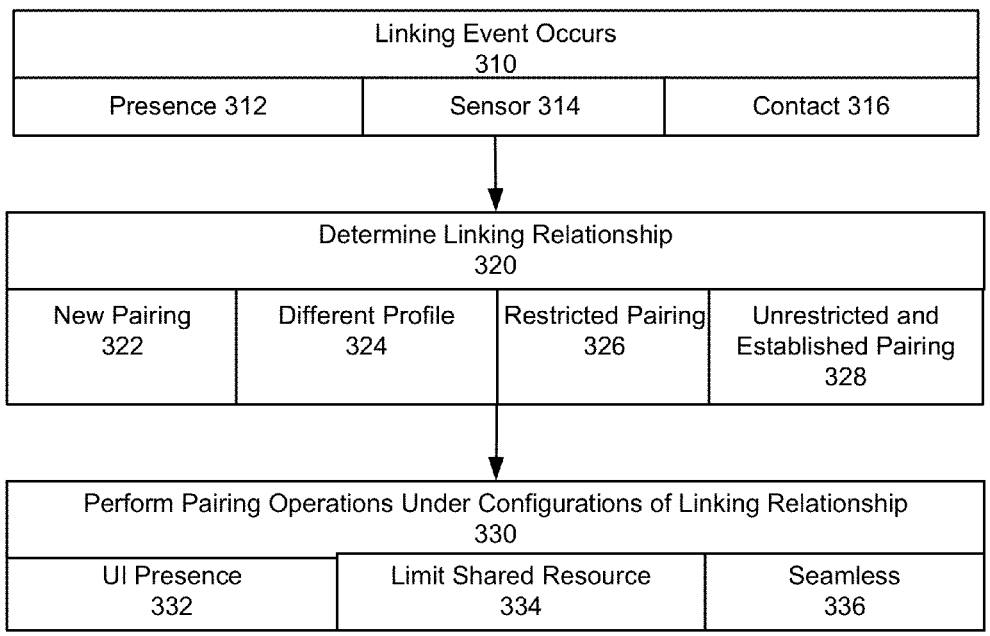
FIG. 3 illustrates a method for configuring pairing of two devices, according to one or more embodiments.

FIG. 3 illustrates a method for configuring pairing of two devices, according to one or more embodiments. A pairing event occurs that triggers two devices into pairing with one another (310). The pairing event may correspond to a first instance when two devices are coupled for pairing (introduction), or to subsequent instances after introduction of the two devices. As described with other embodiments, the pairing event may be triggered by a proximity or presence trigger amongst the two devices. In particular, to devices may pair when (i) in presence of one another, as determined by, for example, a local communication port (312), sensor (e.g. optical or acoustic) (314), or contact or close proximity (316). As described with an embodiment of FIG. 1, contact detection may be made through inductive coupling. However, sensors in combination with accelerometers and/or other components may alternatively be used to determine when two devices contact one another.

Once pairing is triggered, embodiments provide that a determination is made as to the pairing relationship (320). In particular, embodiments recognize that different levels of pairing may be warranted, depending on a variety of factors, including user or manufacturing preferences, security, and/or compatibility. According to some embodiments, one or more of the following determinations may be made: (i) the devices 10, 20 are being introduced (322); (ii) the devices 10, 20 are associated with different profiles (324); (iii) the devices 10, 20 are subject to restricted pairing by one or more rules (such as set forth by the manufacturer or wireless carrier) (326). The determination as to whether two devices are being introduced may be made on each device by comparing the received credential information to a list of devices that are known (i.e. previously connected to) to that device. The list of known devices 131 may be stored in the pairing information data store 120. The determination as to whether the devices are on same profile may be based on using credential information 121, 123, as exchanged by the two devices. Credential information such as device identifier may be compared to lists of devices that are on the user's profile. Such lists may be maintained on, for example, the pairing information data store 120. Another determination that can be made is that no restrictions are to be placed on the pairing (328), based on for example, the two devices having previously been introduced and/or being sharing the same profile.

Pairing operations are then performed using configurations as provided by the pairing determination (330). Various pairing configurations may be employed. Among them, the pairing configuration may require UI presence and interaction from the user (332). For example, if the devices 10, 20 or being introduced in the first pairing, the UI on each device may generate prompts that require input from the user(s) in order to confirm that data is to be transferred from one device to the other. Likewise, if two devices are not on the same profile, UI presence may be required, as the data transfer would be between two different users, rather than the same user.

As an alternative of variation, the pairing configurations may be limited in what is to be shared. For example, if two devices are determined to not be on the same profile, then there may be limitations as to what can be shared by the two devices. For example, emails or other information may not transfer, while content that is in focus on one device may transfer to the other. Additionally, if two devices are of different types, manufacturing or provider rules may preclude a full data transfer that would otherwise be permitted if the two devices were of the same type.

Still further, the configuration of the pairing may be seamless (326). Such pairing may seamlessly cause the transfer of data from one device to the other. Under seamless transfers, background tasks may be used to synchronize records amongst two devices, and to transfer application data in response to designated application events. User settings and pre-determined input may also be used to identify what specific kind of data transfer or to be fully automated, partially automated, or made manual.

Usage Implementations

Figure 4:
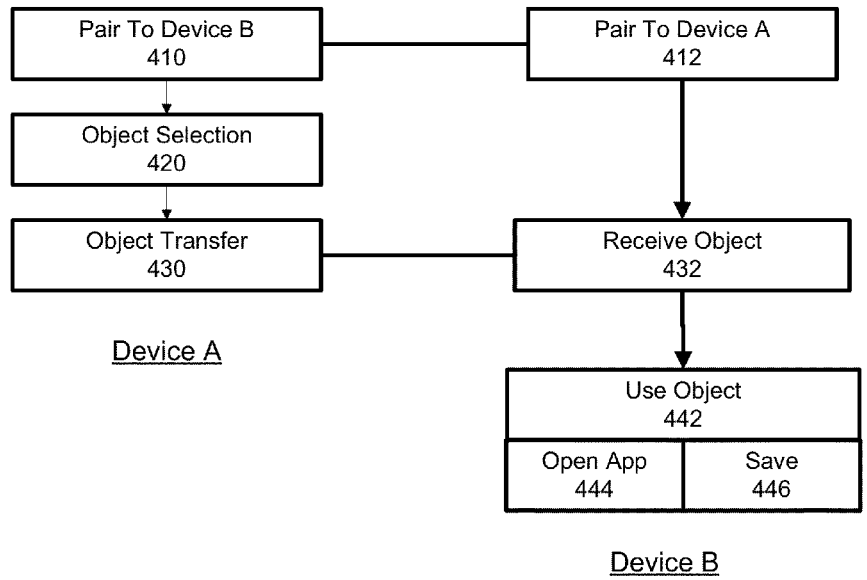
FIG. 4 illustrates a method for sharing data objects amongst paired devices, according to one or more embodiments.

FIG. 4 illustrates a method for sharing data objects amongst paired devices, according to one or more embodiments. Computing devices may pair using credential information that is communicated to the respective devices using an out-of-band communication medium (410, 412). For example, each device may communicate its respective credential information using an inductive signal interface. The pairing establishes a link key that each device can use to communicate with the other device over a local communication port.

While embodiments provide that each device can transmit or receive in the paired relationship, the example shown by FIG. 4 assumes one device ("Device A") communicates a data object to another device ("Device B") using, for example, a local wireless communication medium. In communicating the data object, Device A includes logic (e.g. resource selector 124) to identify what data object is to be selected and communicated (420). In one embodiment, the selection of the data object is made automatically, or substantially automatically using programmatically implemented logic. The selection of the data object may occur in response to a trigger. Examples of triggers that can result in the selection of a data object include: (i) an inductive trigger, corresponding to one or both devices inductively detecting the other; (ii) an RF link trigger, corresponding to one or both devices detecting one another across a communication medium; (iii) application state, such as one application being in focus or in a particular manner of use; (iv) an application event (v) pre-set user settings, and/or (vi) affirmative user input. The data object that is selected may be associated with the particular trigger. In this regard, the object transfer may include object identification and transfer. The object transfer may be performed responsively (e.g. automatically, or substantially automatically) in response to an associated or designated event.

With regard to inductive coupling, the triggering event may coincide with, for example, one or more devices detecting the other device over the inductive communication medium, authenticate the other device, and enumerating information about themselves. An RF link trigger may coincide with, for example, devices becoming in range of one another for purpose of establishing local communication medium. The application event can be application specific, and associated with any event that is designated to cause a sharing of information. Specific examples include a call connect event, and messaging event (receiving or transmitting a message, or a notification generated by one application. The user may also specify settings that identify what triggers aren't to cause data sharing (assuming devices are paired and actively communicating). For example, the user may designate the device 10 to be responsive to inductive triggers, but not application events. Additionally, the user can enter manual input in order to the identified content that is to be shared.

On Device B, the object is received 432 over, for example, the local communication medium. The object may be associated with an application type, which may be identified by the receiving device. The application may be executed (442) (assuming the application is not already opened). An operation is then performed by the application (444), using the object communicated from the Device A. FIG. 7A through FIG. 7C and FIG. 8A through FIG. 8C illustrate examples of the transfer of an object corresponding to a URL, and its use thereof. As an alternative or addition, the object may be saved on Device B.

According to embodiments, much of the data exchange through the pairing between device A and device B is automatically communicated and/or used (446). Accordingly, for example, the object may be placed in use on device B without user input. This may correspond to the object being utilized in an application (which may require the application to be opened) in a manner that is automated.

Figure 5:
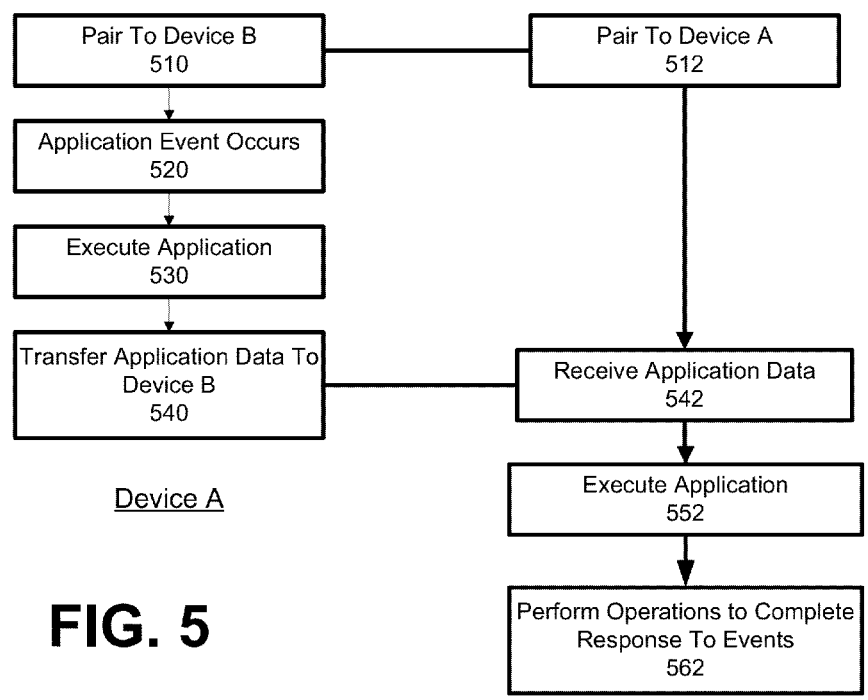
FIG. 5 illustrates a method for sharing application data amongst paired devices, according to one or more embodiments.

FIG. 5 illustrates a method for sharing application data amongst paired devices, according to one or more embodiments. Devices may pair in a manner described with, for example, prior embodiments (510, 512). In an embodiment, one or both devices may be configured to respond to a particular application event. Application events can include those requiring tasks or operations performed by specific application as, including background tasks or operations performed when the application is in active use. Specific examples of application events include call connect events (user receives or places call), messaging events (device receives or sends message), and/or notifications. Device A may be configured to detect the application event (520). The application event may be detected by a corresponding application (one that handles the event), or by some other programmatic component of the device.

The application receiving the application event may execute on the Device A (530). According to some embodiments, at least part of the response to the application event can be performed on Device B. In such embodiments, Device A may execute by launching (if application not opened). Device A may execute the application by generating application data for completing operations in response to the application event. The application data is then transferred to Device B using the medium of the pairing (540). For example, Device A transfers application data to Device B using the local wireless communication medium (e.g. Bluetooth, WiFi).

Device B receives the application data in response to the occurrence of the application event (542). In response, Device B opens the corresponding application (552) and performs operations for completing the response to the application event (562).

Figure 6:
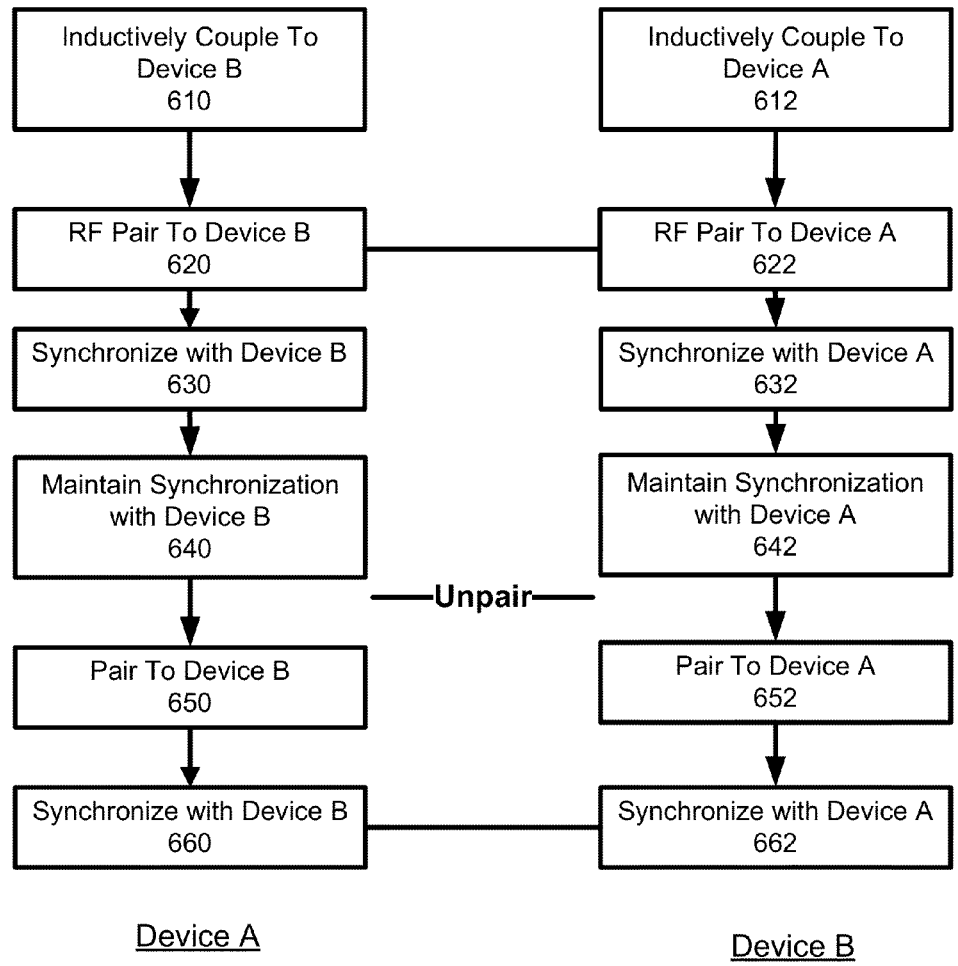
FIG. 6 illustrates another embodiment in which two devices are paired to enable ongoing pairing and synchronization between the two devices, according to one or more embodiments.

FIG. 6 illustrates another embodiment in which two devices are paired to enable ongoing pairing and synchronization between the two devices, according to one or more embodiments. With reference to FIG. 6, Device A and Device B can be inductively coupled to exchange credential information. The process by which the two devices are inductively coupled may correspond to one or more of the following: (i) the two devices may exchange data in connection with one device inductively supplying power to the other device; (ii) the two devices may exchange data through inductive communication medium. In the latter case, inductive coupling may be achieved by simple tap between two devices. Still further, inductive coupling may be achieved by bringing devices sufficiently proximate to one another to trigger coil response.

The two devices may pair using credential information exchange over the inductive medium (620, 622). As described with some other embodiments, the pairing may be achieved over local wireless communication medium, such as provided by Bluetooth or WiFi.

When the pairing over the local wireless communication medium is achieved, one or both devices may synchronize with the other (630, 632). Synchronization on each device may correspond to one or more of the following: (i) device overwrites some or all of its records with records received from another device, (ii) device analyzes records with information (or records) received from another device in order to identify changes, modifications, additions, or deletions, and/or (iii) device communicates records and/or information about records to the other device.

Synchronization may be performed on different collections of records and data. Examples of data files that can be synchronized amongst two devices include: emails folders, SMS and/or MMS messaging folders, pictures, media collections (e.g. music), documents, applications and personal information records such as contact records, calendar events.

In some embodiments, while the devices are paired, each performs operations to maintain a synchronized state between the two for example, one or both devices may periodically communicate an update to the other device (640, 642). The update may have the form of metadata, or the actual records/data sets that are to be maintained on each device. Alternatively, one or both devices may synchronize a collection of records or datasets a response to an event that alters the collection. For example, if email records are being synchronized amongst the two devices, Device A may generate an outgoing communication to synchronize Device B, based on Device A receiving the change. The latter implementation may be most pertinent when only one of the two devices has capability to be updated. For example, if Device A includes cellular messaging capabilities, and Device B does not, the update to Device A may be received from a cellular data channel and then communicated to Device B. Likewise, Device B may receive updates through user input, and then communicate those updates to Device A.

As shown by an embodiment of FIG. 6, when pairing is accomplished through exchange of credential information that is passed through an out-of-band medium (e.g. inductive channel), the out-of-band data (or keys generated therefrom) can be treated as authenticating when used in subsequent communication sessions. Among other benefits, embodiments recognize that the link key generation through the passage of credential information over the inductive channels enables automatic device pairing for various applications, such as synchronization. In particular, embodiments provide that the link key generated through the passage of credential information over the inductive medium enables the two devices to automatically pair over a local wireless communication medium repeatedly 650, 652), to establish multiple communication sessions. Thus, if as shown, the two devices terminate a communications session (e.g. one device turns of or leaves range of RF medium), the link key established using the inductive channel can be used to automatically pair the two devices when the two devices encounter one another over the wireless communication medium. Once paired, the two devices automatically perform a designated set of operations, such as synchronization operations.

FIG. 7A through FIG. 7C, FIG. 8A through FIG. 8C, FIG. 9A through FIG. 9C, FIG. 10A through FIG. 10C, and FIG. 11A through FIG. 11C each illustrate an implementation for auto-pairing two devices using a combination of inductive credential exchange and wireless communications, according to one or more embodiments. The examples provided illustrate pairing as between a mobile computing device 710 and a tablet device 720. Each device is equipped with an inductive signal interface (not shown). On the device 710, the inductive signal interface is provided on a rear façade of the device. On the tablet 720, the inductive signal interface is provided on a front surface.

Figure 7C:
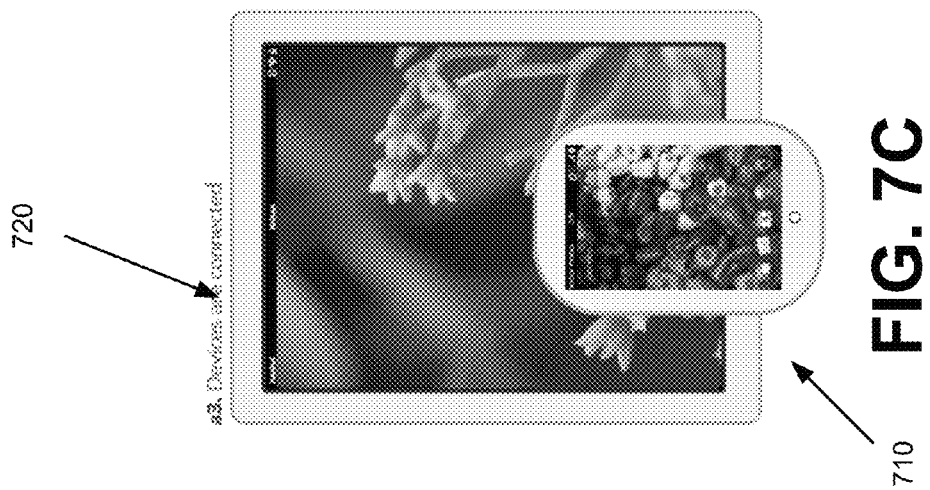
FIG. 7A through FIG. 7C illustrate inductive coupling and subsequent RF pairing between two devices, according to one or more embodiments.
Figure 7B:
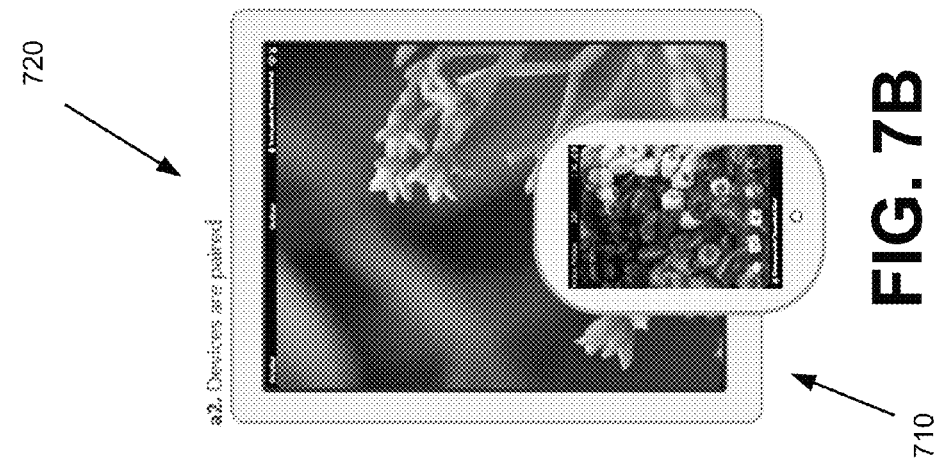
Figure 7A:
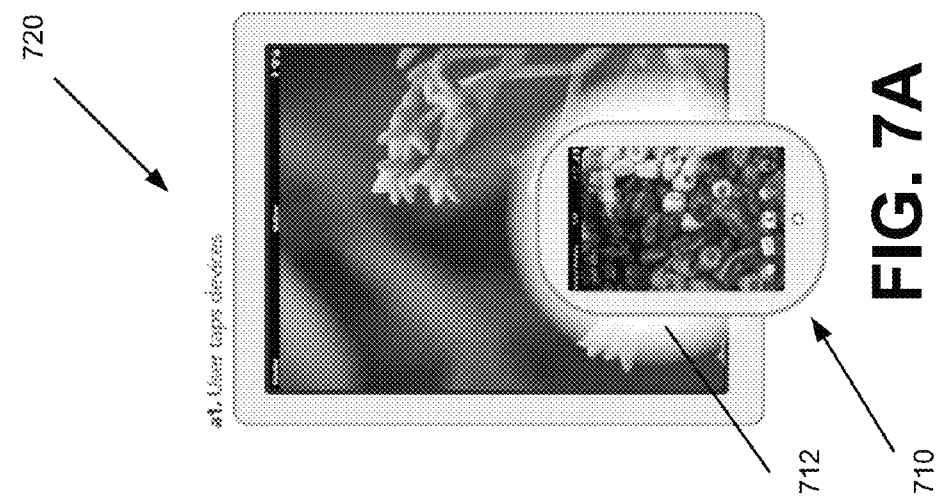

FIG. 7A through FIG. 7C illustrate inductive coupling and subsequent RF pairing between two devices, according to one or more embodiments. The inductive pairing is accomplished by bringing the two devices 710, 720 into contact with one another. In particular, a user can align surfaces of the two devices so that the coils of the respective devices are aligned. (see FIG. 7A). The user then taps (or brings into contact) one device against the other, with coils maintaining alignment. In one embodiment, when the coils are in alignment and brought near one another, the user is provided a visual feedback on the screen of one or both devices. The visual feedback indicates to the user that the coils of the two devices are aligned sufficiently to initiate an inductive pairing.

In the example provided, the visual feedback as provided by way of a halo 720, which propagates across at least a portion of the display area. In at least some variations, the halo 712 indicates that the inductive pairing of the two devices is ongoing, or alternatively complete. Additional or alternative indicators may be provided, including audible or vibration indicators.

In order to effectuate an effective exchange of credential information, embodiments provide that the two devices need only to be momentarily tapped. In the act of tapping, one or both devices may identify the other, use inductively exchanged information to authenticate the other device, enumerate, and further pass additional data such as credential information for enabling generation of a link key to enable the two devices to securely pair to one another using a local wireless communication port.

In FIG. 7A, the halo 712 indicates that the coils are aligned properly. As mentioned, other visual indicators may be used. The inductive coupling between the two devices results in the two devices being paired across a local wireless communication port. FIG. 7B illustrates that each device conveys a message for when the wireless link is established. FIG. 7C illustrates that when the devices are connected, Bluetooth (or other indicators) show each device as being wirelessly connected.

Figure 8C:
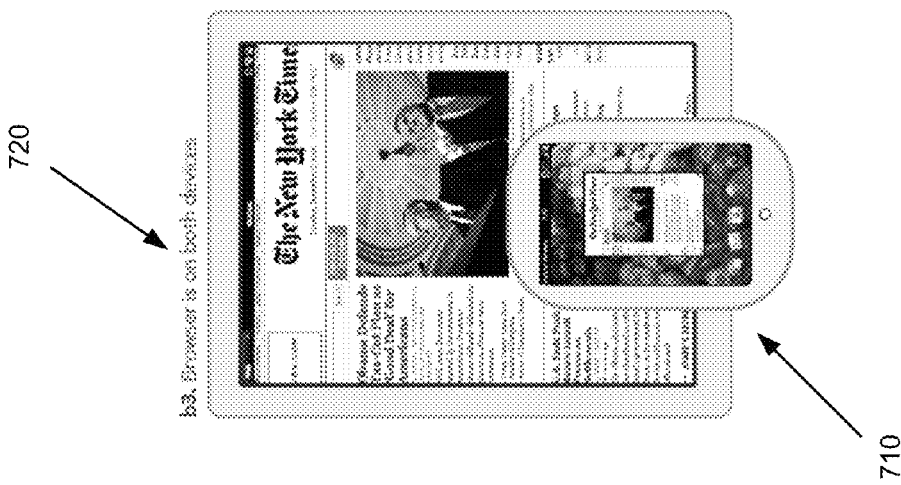
FIG. 8A through FIG. 8C illustrates object sharing amongst paired devices, in accordance with one or more embodiments.
Figure 8B:
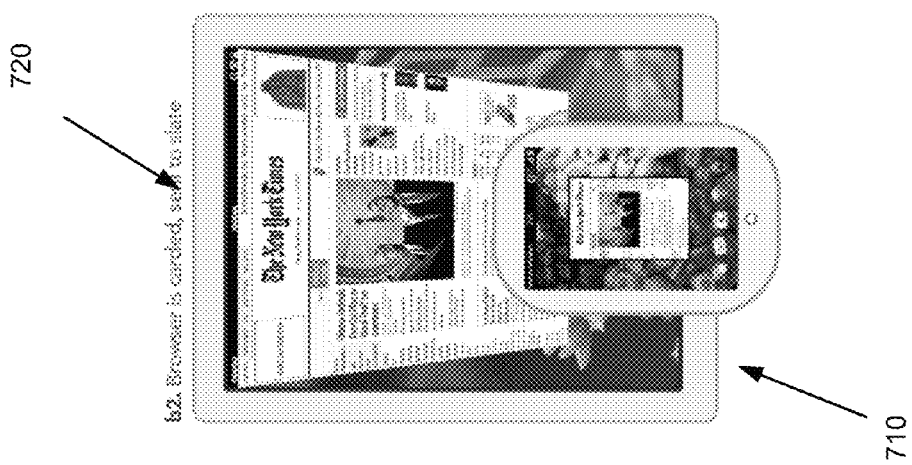
Figure 8A:
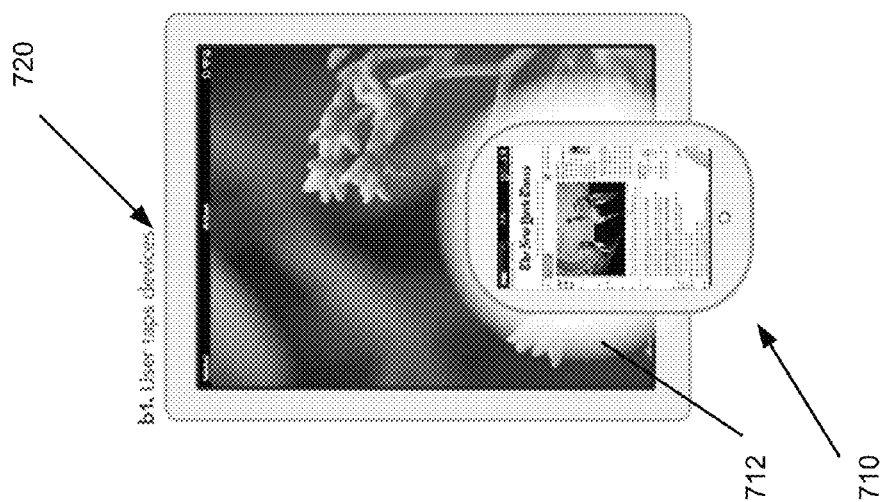

FIG. 8A through FIG. 8C illustrates object sharing amongst paired devices, in accordance with one or more embodiments. In the example provided, device 710 operates (or has in focus) a browser application that utilizes a URL. The URL may correspond to an object that can be passed to the tablet device 720. In FIG. 8A the two devices are inductively coupled, generating the halo 712. In the implementation depicted, the browser on the device 710 carded, while a new application card is launched on the tablet device 720. The depiction of cards corresponds to windows in which application content is displayed. When an application is carded on one device, it coincides with the window carrying the application content being reduced and made into an object that can be moved or discard it. Furthermore, in the example provided, the tablet device 720 launches its browser and uses the past URL to navigate the corresponding page. The launch of the browser, and use of the URL by the browser, may be performed automatically on the tablet 720. That webpage may be displayed on the screen of the tablet. In the example provided, the webpage is displayed in a full-screen mode, in order to take advantage of the added display screen and resources of the tablet 720 (as compared to the mobile device 710).

Figure 9C:
FIG. 9A through FIG. 9C illustrate a variation to object sharing amongst paired devices, in accordance with one or more embodiments.
Figure 9B:
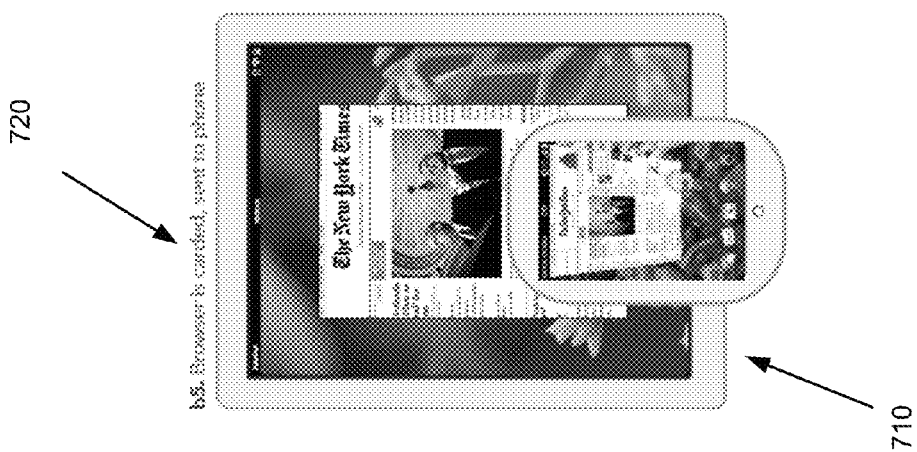
Figure 9A:
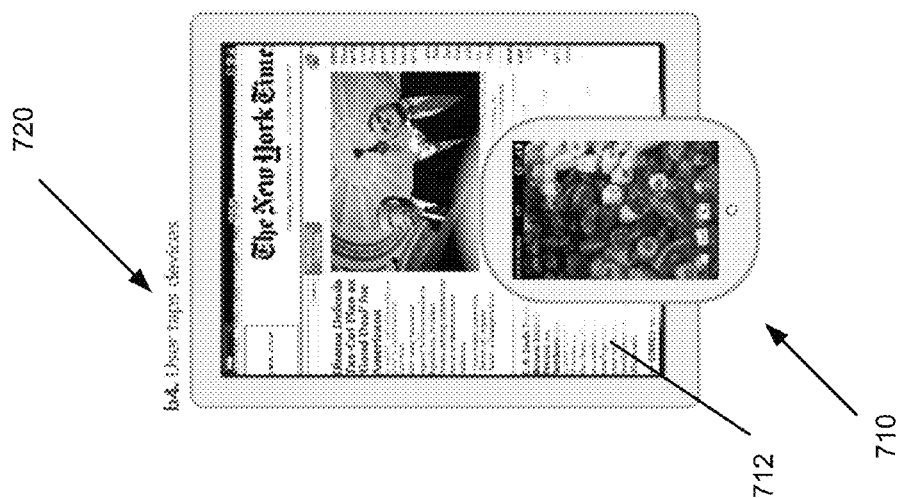

FIG. 9A through FIG. 9C illustrate a variation to object sharing amongst paired devices, in accordance with one or more embodiments. In contrast to the examples provided by FIG. 8A through FIG. 8C, FIG. 9A through FIG. 9C depict content as being initially displayed on the tablet device 720 prior to inductive pairing with the mobile device 710. In FIG. 9A, the inductive pairing occurs with the mobile device 710 being tapped against a tablet device 720. With the content displayed in the tablet device, the halo 712 is overlaid on the displayed application content. FIG. 9B content being carded on the tablet device 720. A card is introduced on the mobile device 710, carrying the application content from the tablet device 720. As described with other embodiments, after the devices are inductively paired (as shown by FIG. 9A), the tablet device 720 transmits wirelessly (over a local RF communication medium) in object corresponding to a URL. On the mobile device 710, the browser is launched, and the URL is used by the browser to navigate to the webpage previously rendered on the tablet 710. In FIG. 9C, both devices render the browser content as located by the URL that is transmitted from the tablet device.

FIG. 10A through FIG. 10C illustrate application data sharing amongst paired devices, in response to occurrences of application events, according to one or more embodiments. FIG. 10A through FIG. 10C assume devices are paired and in communication over a local RF link (e.g. Bluetooth). As described with prior embodiments, the local RF link may be established using data communicated by the inductive pairing, which authenticates and selects the devices for secure communications with one another. Once paired, the two devices may share application data responsive to application events. In one embodiment, mobile device 710 may receive an incoming phone call (application event). The incoming phone call may correspond to a call connect event. Other call connect event include, for example, the user attempting to operate one or the other device to place a call.

In an embodiment, when the two devices are paired, the mobile device 710 automatically notifies the tablet device 720 of the incoming call. The tablet device 720 may lack telephony resources in and of itself, but may be telephonically enabled when paired to the mobile device 710. The user may provide settings or input to enable automatic notification of incoming calls, as well as other application events, which can be provided on one or both devices. Alternatively, when the user receives a telephone call on the mobile device 710, he may perform some action on one or the other device to cause application data associated with incoming phone call to be transferred to the tablet device 720.

According to an embodiment, the application data communicated from one device to the other may cause the receiving device to launch a corresponding application. In the example provided, mobile device 710 communicates application data corresponding to information about the incoming call. The tablet device 720 may launch a phone application to handle the data communicated from the incoming call. In this regard, the tablet 720 may operate in a headset mode with the device 710. FIG. 10B illustrates that the application interface provided on the tablet may include many of the same functions provided on the mobile device, such as call conferencing, hang-up, mute, and dialpad functionality. Thus, the management functions that are used on the mobile device 710 can be replicated on the tablet 720. Such features include dialing phone calls, answering incoming calls, hanging up calls, rejecting calls. More advanced functionality includes multi-party call features such as call waiting, swapping calls, conferencing calls, pulling calls out of conference into private calls FIG. 10C illustrate that the user can transfer a call from the phone 710 to the table7 720 using the local RF link.

FIG. 11A through FIG. 11C illustrate a variation to application data sharing amongst paired devices, in response to occurrences of application events, according to one or more embodiments. FIG. 11A and FIG. 11B illustrate an application event corresponding to the user placing a call. When the two devices are synced, they launch a telephony application on either device in order to initiate a phone call. In some embodiments, the tablet device 720 lacks telephony resources in and of itself. The tablet device 720 can be used as a telephony device only if it is paired with the mobile device 710. If the user initiates the phone call from the mobile device 710, or uses the tablet when the two devices are paired, the call connect event can be accomplished. If however, the user initiates the call connect from the tablet device 720 when the two devices are not paired, the application running on the tablet device 720 is inoperable, at least for the purpose of connecting the call.

Alternatives and Variations

Numerous alternatives and variations exist to embodiments described herein. In one embodiment, devices share input. For example, a user may interact with the touch-screen of the tablet device 720 in order to enter the same input on the mobile device 710. Specific inputs that can be enhanced with sharing include those relating to movement or motion by the user other than direct contact with a physical interface of the device. For example, one device may include gesture detection resources to detect a user making gestures with fingers or arms. The gesture recognition may be processed as input, and shared by one device to the other (using pairing as described herein).

As another example, one device may share its accelerometer information with the other as a result of being auto-paired. For example, with reference to FIG. 7A through FIG. 7C, the mobile device 710 may be moved (e.g. jerked or thrown), resulting in generation of accelerometer information. The motion (or accelerometer use) may further trigger the accelerometer input to be communicated to the tablet device 720. A user may enter input by, for example, throwing' his device in a direction of the tablet 720.

It is contemplated for embodiments described herein to extend to individual elements and concepts described herein, independently of other concepts, ideas or systems, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for pairing a first computing device having a first inductive coil, with a second computing device having a second inductive coil, the method comprising:
   (a) establishing a communication link with the second computing device corresponding to a wireless communication medium;
   (b) receiving credential information for the second computing device over the wireless communication medium;
   (c) in response to receiving the credential information, generating a link key using the credential information for pairing with the second computing device over an inductive communication medium;
   (d) storing the link key for use in inductively pairing the first computing device with the second computing device over multiple communication sessions, wherein each of the multiple communication sessions corresponds to an individual inductive pairing and unpairing of the first computing device and the second computing device;
   (e) in response to an inductive pairing of the first computing device and the second computing device, automatically sending data to the second computing device, the data corresponding to one of (i) a web uniform resource locator (URL) corresponding to a webpage displayed on a display of the first computing device, or (ii) application data corresponding to an application running on the first computing device and the second computing device, wherein automatically sending the data to the second computing device causes a graphic interface, corresponding to the URL of the webpage or the application data, to be rendered on the display of the second computing device;
   wherein the inductive pairing of the first computing device and the second computing device includes aligning the first and second inductive coils, and wherein the alignment of the first and second inductive coils is indicated via a visual indicator on the display of at least one of the first computing device or the second computing device.

2. The method of claim 1, wherein steps (a) through (c) are performed in a first communication session over the wireless communication medium.

3. The method of claim 1, wherein the first computing device utilizes the stored link key to connect with the second computing device over a plurality of communication medium.

4. The method of claim 1, wherein inductive pairing of the first computing device and the second computing device using the link key is performed automatically in response to detecting that the second computing device is within an inductive range of the first computing device.

5. The method of claim 1, further comprising:
   in response to inductively pairing the first computing device and the second computing device, automatically establishing a local radio-frequency link between the first computing device and the second computing device, wherein automatically sending the data to the second computing device is performed over a local radio-frequency communication medium corresponding to the local radio-frequency link.

6. The method of claim 1, wherein the visual indicator corresponds to a halo rendered on the display of the second computing device.

7. The method of claim 1, wherein the first and second computing devices correspond to a mobile computing device and a tablet device.

8. The method of claim 1, further comprising:
   in response to sending the application data, analyzing and synchronizing a set of records corresponding to the application running on each of the first computing device and the second computing device.

9. The method of claim 1, wherein sending the data includes sending media data that is received and outputted on the second computing device.

10. The method of claim 5, wherein an application event causes a user notification to be displayed on at least one of the first computing device or the second computing device, and wherein sending the application data renders a graphic corresponding to the application event on the other of the first or second computing device.

11. The method of claim 10, wherein the application data is for a telephony application, and wherein the application event corresponds to a received phone call, and wherein sending the application data includes enabling the second computing device to receive the phone call.

12. A method for pairing a first computing device having a first inductive coil, with a second computing device having a second inductive coil, the method comprising:
   (a) inductively communicating with a second computing device to receive credential information;
   (b) determining, based on the credential information, a pairing configuration for the first computing device and the second computing device; and
   (c) in response to determining the pairing configuration, pairing the first computing device and the second computing device according to the pairing configuration by establishing a local wireless communication link;
   (d) storing the pairing configuration for use in inductively pairing the first computing device with the second computing device over multiple communication sessions, wherein each of the multiple communication sessions corresponds to an individual inductive pairing and unpairing of the first computing device and the second computing device;
   (e) in response to a subsequent inductive pairing of the first computing device and the second computing device, automatically sending data to the second computing device, the data corresponding to one of (i) a web uniform resource locator (URL) corresponding to a webpage displayed on a display of the first computing device, or (ii) application data corresponding to an application running on the first computing device and the second computing device, wherein automatically sending the data to the second computing device causes a graphic interface, corresponding to the URL of the webpage or the application data, to be rendered on the display of the second computing device;
   wherein the first computing device includes a first profile and the second computing device includes a second profile; and
   wherein inductively pairing with the second computing device includes aligning the first and second inductive coils, and wherein the alignment of the first and second inductive coils is indicated on a display of one or more of the first computing device and the second computing device.

13. The method of claim 12, wherein (b) includes determining whether the first computing device and the second computing device have previously paired.

14. The method of claim 13, wherein (c) includes generating a user prompt for user-input to pair the first computing device and the second computing device.

15. The method of claim 12, wherein (b) includes determining whether the first profile and the second profile are associated.

16. The method of claim 15, wherein (c) includes limiting resources to be shared between the first computing device and the second computing device in response to determining that the first profile and the second profile are not associated.

17. The method of claim 12, wherein (b) includes determining a type of the second computing device.

18. The method of claim 17, wherein (c) includes limiting resources to be shared between the first computing device and the second computing device in response to determining that the second computing device is of a particular type.

19. The method of claim 12, wherein (c) is performed automatically in response to (a) being performed.

20. A first computing device comprising:
a first inductive signal interface;
a local communication port;
a memory resource; and
one or more processors coupled to operate the first inductive signal interface and the local communication port,
the one or more processors to:
establish a communication link with a second computing device corresponding to a wireless communication medium;
receive credential information for the second computing device over the wireless communication medium;
in response to receiving the credential information, generate a link key for pairing with the second computing device over an inductive communication medium, wherein the second computing device includes a second inductive interface; and
in response to an inductive pairing of the first computing device and the second computing device, automatically sending data to the second computing device, the data corresponding to one of (i) a web uniform resource locator (URL) of a webpage displayed on a display of the first computing device, or (ii) application data corresponding to an application running on the first computing device, wherein automatically sending the data causes a graphic interface, corresponding to the URL of the webpage or the application data, to be rendered on a display of the second computing device;
wherein the link key is stored in the memory resource for use in inductively pairing the first computing device with the second computing device, and
wherein the inductive pairing of the first computing device and the second computing device includes an alignment of the first and second inductive interfaces, and wherein the alignment of the first and second inductive interfaces is indicated via a visual indicator on a display of at least one of the first computing device or the second computing device.

21. The first computing device of claim 20, wherein the one or more processors are further configured to generate a link key for a third computing device using credential information that is exchanged with the third computing device over the local communication port.

22. The first computing device of claim 21, wherein the link key for the third computing device is generated in response to a user input.

23. The first computing device of claim 20, wherein the one or more processors are further configured to automatically pair with the second computing device using the link key in response to detecting that the second computing device is within an inductive range of the first computing device.

* * * * *